Jan. 24, 1967  J. J. FELTS ETAL  3,299,733
VEHICULAR MOVABLE STEERING COLUMN
Original Filed Sept. 19, 1962  3 Sheets-Sheet 1
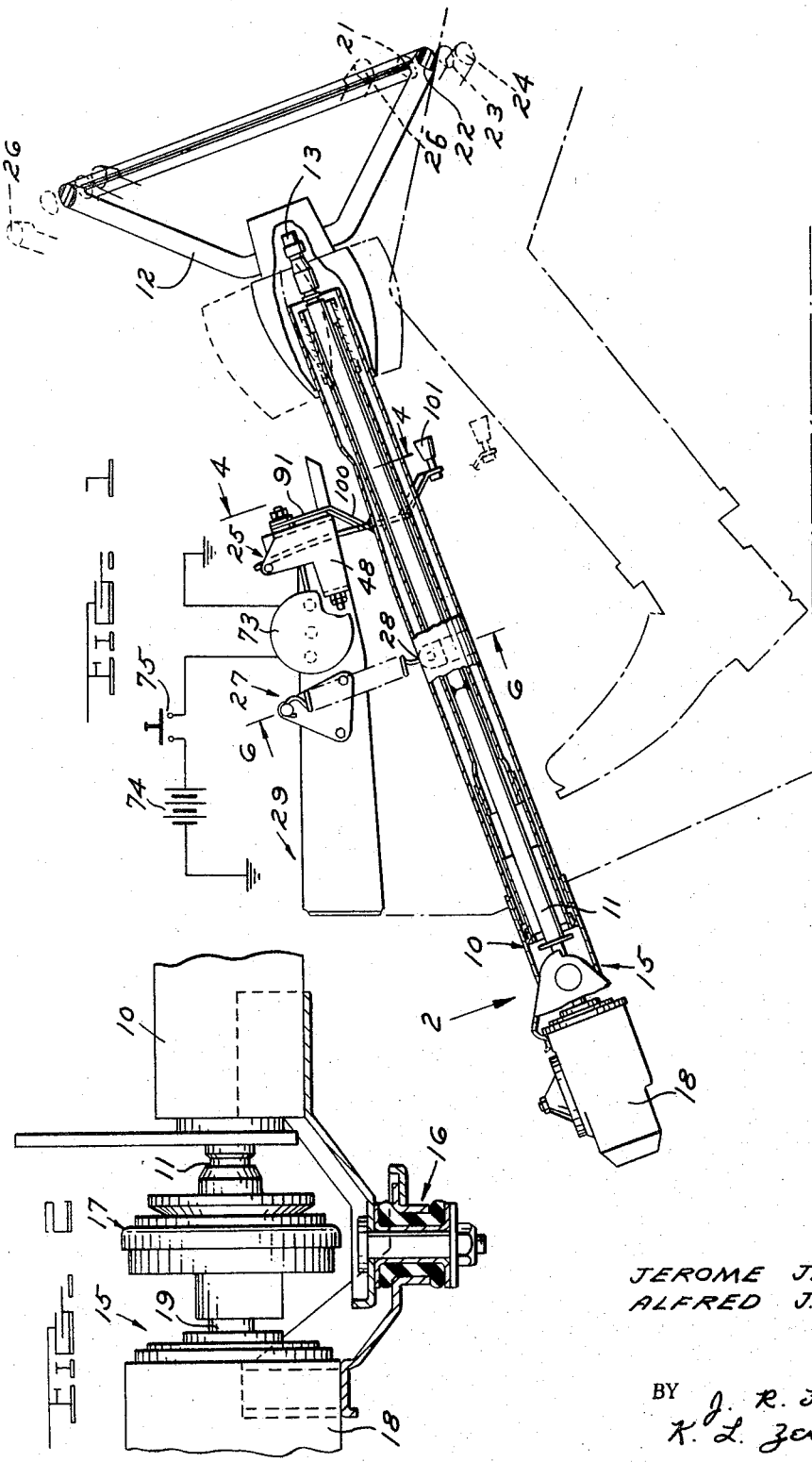
JEROME J. FELTS
ALFRED J. GOTT
INVENTORS
BY J. R. Faulkner
K. L. Zerschling
ATTORNEYS

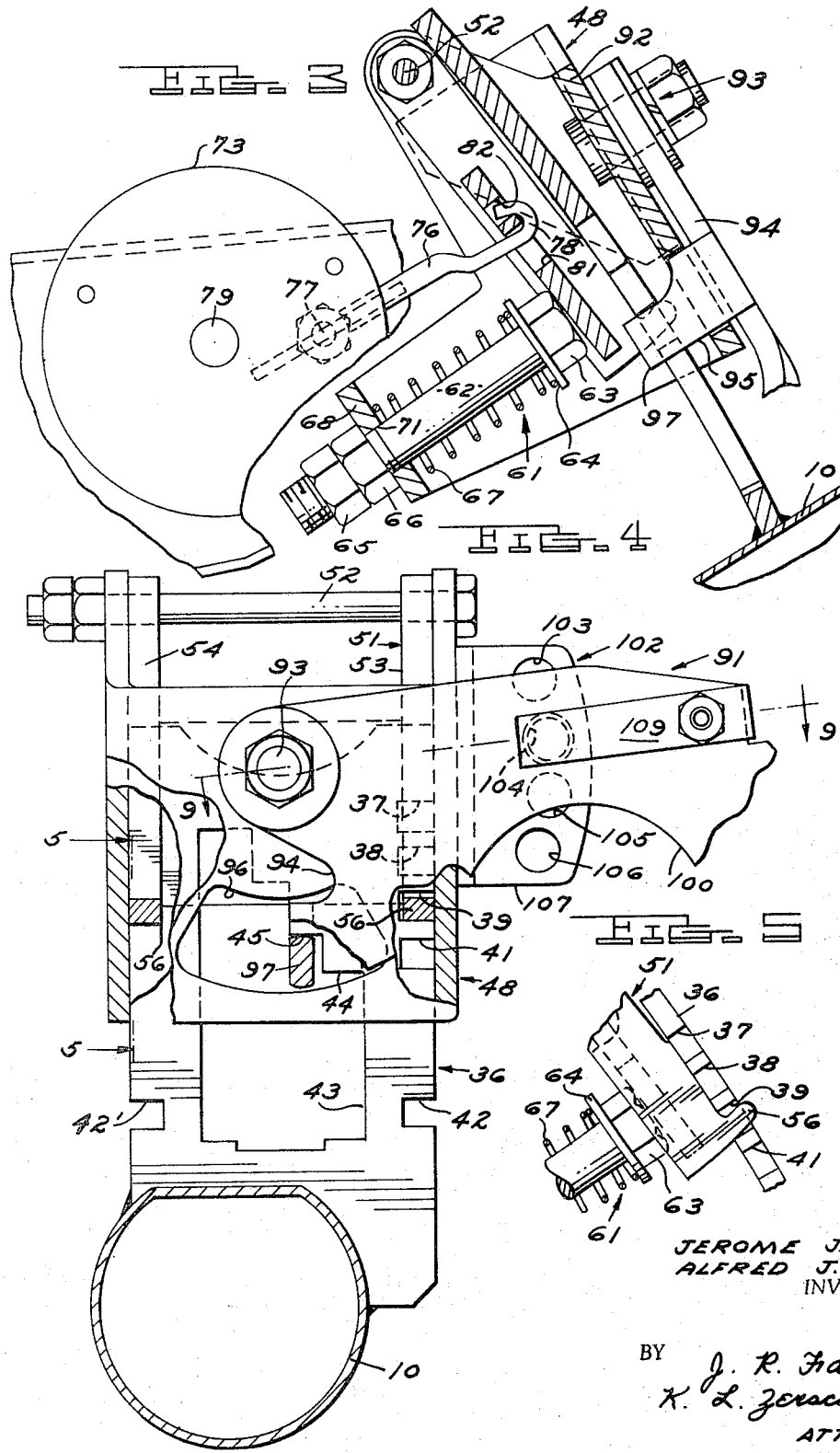

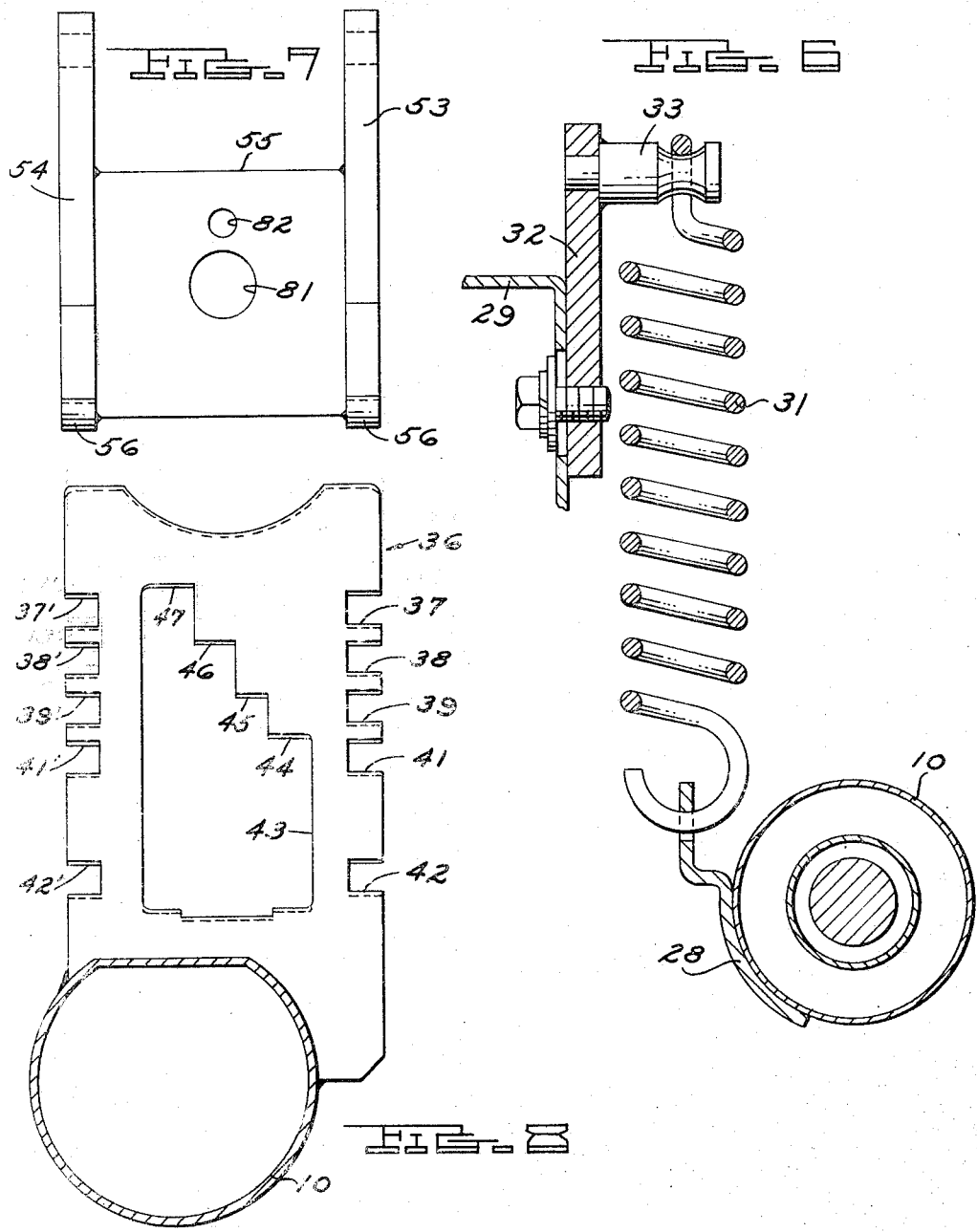

United States Patent Office 3,299,733
Patented Jan. 24, 1967

3,299,733
VEHICULAR MOVABLE STEERING COLUMN
Jerome J. Felts, Birmingham, and Alfred J. Gott, Belleville, Mich., assignors to Ford Motor Company, Dearborn, Mich., a corporation of Delaware
Continuation of application Ser. No. 224,738, Sept. 19, 1962. This application Feb. 12, 1965, Ser. No. 438,165
15 Claims. (Cl. 74—493)

This application is a continuation of our copending application S.N. 224,738, filed September 19, 1962, now abandoned.

This invention relates to a motor vehicle steering mechanism and more particularly to a movable steering column for a motor vehicle.

In many modern automotive vehicles the steering wheel column extends at a small acute angle to the horizontal plane of the vehicle, and the vehicle seat is positioned in close proximity to the lowermost point of the steering wheel. This arrangement presents some difficulty for many individuals in entering and leaving the driver's seat of the vehicle. In addition, a vehicle must be designed for the so-called average or normal person in regard to the position of the steering column and the driver's seat. It is obvious, however, that many individuals do not fit this normal or average pattern. There will be great variations in the size of people operating a given model or line of vehicle, particularly in the height of these individuals.

The invention provides a movable steering column that may be displaced from a normal operative position to a displaced position for the purpose of easy access to and egress from the driver's seat of the vehicle. In addition, the invention provides an adjustable steering column that may be adjusted in a plurality of discrete operative or driving positions preferably along a plane having a substantial vertical component. This latter feature permits the steering column to be adjusted for optimum steering ease and visibility for each individual vehicle operator.

In the invention a steering column is supported in a vehicle for movement from a normal operative position to a displaced position. A latch means is provided for releasably retaining the steering column in the normal operative position. When the latch means is released by the motor vehicle operator, the steering column is moved from the normal operative position to the displaced position by suitable means engaging the steering column, for example, by means of a coiled helical spring. It can be readily seen that this feature provides a means for easy access to and egress from the driver's seat of the vehicle, since the driver need only release the latch means to have the steering column move to its displaced position.

The latch means also has operatively coupled with it a means by which the normal operative position referred to above may be any one of a number of discrete positions of the steering wheel, with the positions being spaced so that the movement of the steering column between them will have a substantial vertical component. In this regard, an adjustable selector means is provided that positions the steering column in a preselected normal operative position that is most convenient for the driver of the vehicle. As a result of this steering wheel mechanism, the driver of the vehicle may select his normal driving or preferred position for the steering column from a number of various positions, and a latch means holds the steering column in this position. When the operator of a vehicle wishes to leave the driver's seat he releases the latch mechanism and the steering wheel will automatically move to the displaced position thereby providing easy egress from the driver's seat. When the driver again enters the driver's seat, he merely moves the steering column toward his normal or preferred driving position, and when it comes to such a position the adjustable selector means limits its movement. The latch means may then be employed to lock the steering column in this position.

An object of the invention is to provide a movable steering column for a motor vehicle that will provide easy access to and egress from the driver's seat of the vehicle.

A further object of the invention is the provision of a movable adjustable steering column that may be positioned in any one of a plurality of discrete operative or driving positions.

A further object of the invention is to provide a movable steering column that may be automatically moved from a normal operative position to a displaced position without appreciable physical effort on the part of the driver.

Still another object of the invention is the provision of an adjustable and movable steering column for a motor vehicle in which the operator of the motor vehicle may select any one of plurality of discrete driving or operative positions and in which the steering column may be moved from such a position to a displaced position without appreciable effort from the driver when he desires to leave the vehicle. When the driver returns to the vehicle, means are provided for automatically locating the selected driving or operative position of the vehicle as the driver moves the steering column toward the plurality of operative positions.

Other objects and attendant advantages of the invention will become more readily apparent as the specification is considered in connection with the attached drawings in which:

FIGURE 1 is a side elevational view partially in section of the steering column embodying the present invention;

FIGURE 2 is a partial elevational view partially in section taken in the direction of the arrow shown in FIGURE 1;

FIGURE 3 is a sectional view partially in elevation through the latch mechanism of the invention;

FIGURE 4 is an elevational view partially in section taken along the lines 4—4 of FIGURE 1;

FIGURE 5 is an elevational view taken along the lines 5—5 of FIGURE 4;

FIGURE 6 is a sectional view taken along the lines 6—6 of FIGURE 1;

FIGURE 7 is an elevational view of the pawl employed with the latch mechanism of the invention;

FIGURE 8 is an elevational view of the plate connected to the steering column, shown in section, that cooperates with the pawl to provide the latch mechanism of the invention, and FIGURE 9 is a sectional view taken along the lines 9—9 of FIGURE 4.

Referring now to the drawings in which like reference numerals designate like parts throughout the several views thereof, there is shown in FIGURE 1 a steering column generally designated by the numeral 10. The steering column includes a steering shaft 11 to which a steering wheel 12 is suitably affixed, as shown at 13. The steering column is supported within the motor vehicle for movement among a plurality of discrete driving or operative positions and to a displaced position, preferably by means of a pivotal connection shown generally by the numeral 15. This pivotal connection preferably takes the form of a conventional resilient bushing 16 that has its axis positioned in a horizontal plane and a flexible coupling 17. The resilient bushing 16 and the flexible coupling 17 thus pivotally connect the steering column 10 to a support structure of the motor vehicle, for example, to a steering gear 18 that is supported within the motor vehicle. As is conventional in vehicular steering columns, the flexible coupling 17 connects the steering shaft 11 with input shaft 19 of the steering gear 18, and in this case is sufficiently flexible to permit movement of the steering column as described above.

The invention employs a means for releasably latching the steering column in any one of a plurality of normal operative positions, 21, 22, 23 or 24, as shown in FIGURE 1. This means may take the form of a releasable latch mechanism designated generally by the numeral 25. The invention also includes a means for moving or urging the steering column from one of the normal operative positions to a displaced position, designated by the numeral 26, when the latch mechanism is released. This means is preferably a spring means 27 that has one end connected to a structural member 28 of the steering column and has the other end connected to the motor vehicle, for example, to a support member 29 positioned near the instrument panel.

As can be most readily seen by an inspection of FIGURE 6, the spring means 27 may include a helical coiled spring 31 having one end affixed to the steering column 10 through the structural member 28. The other end of the spring is connected to the support member 29 through a plate 32 that is affixed to the support member and through a pin 33 that is affixed to the plate 32.

The releasable latch mechanism 25 comprises a plate 36 that is suitably affixed to the steering column 10. This plate extends upwardly from the steering column and includes a plurality of sets of notches positioned along either edge thereof as shown in FIGURE 8. The sets of notches, designated by the numerals 37 and 37', 38 and 38', 39 and 39', and 41 and 41', correspond to the operative positions of the steering wheel 12 as designated by the numbers 24, 23, 22 and 21 respectively. The lowermost set of notches 42 and 42' positioned in the plate 36 corresponds to the displaced position of the steering column as shown at 26 in FIGURE 1. The plate 36 also has a stepped central aperture 43 positioned therein that is stepped along one side to provide shoulders 44, 45, 46 and 47. These shoulders correspond to the operative positions 21, 22, 23 and 24 respectively of the movable steering column 10 as shown in FIGURE 1.

The plate 36 is received in a housing 48 that is suitably supported in the vehicle, preferably by the support member 29. As can best be seen by reference to FIGURE 4, the housing 48 has an interior width substantially equal to the width of the plate 36. This structure or feature prevents the steering column 10 from rotating about its own axis, and holds it for movement in substantially a single plane.

A pawl, generally designated by the numeral 51, is pivotally mounted within the housing 48, preferably along a substantially horizontal axis, by means of a nut and bolt assembly 52. The pawl 51, as best seen in FIGURE 7, is generally U-shaped and has two side walls 53 and 54 that are spaced from one another by a central wall 55. As can best be seen by reference to FIGURE 4 the outside width of the pawl 51 between the side walls 53 and 54 is substantially equal to the interior width of the housing 48 and to the width of the plate 36. Each side wall has a tooth 56 located at its lower extremity for engaging the sets of notches 37 and 37', 38 and 38', 39 and 39', 41 and 41', and 42 and 42' positioned in the plate 36.

The pawl 51 is urged in a counterclockwise direction toward the plate 36 by a spring assembly 61 shown in FIGURES 3 and 5 so that the teeth 56 will be positioned within one of the sets of notches in the plate member. This spring assembly includes a bolt 62 having a head 63 and a washer 64 positioned at one end. The bolt also has a pair of nuts 65 and 66 attached to the other end thereof, and a helical spring 67 is positioned between a wall 68 of the housing 48 and the washer 64 to urge the bolt toward the pawl 51 and the plate 36. For this purpose the wall 68 of the housing 48 has an aperture 71 positioned therein to permit the bolt to slide in the housing in a direction parallel to its longitudinal axis. As shown in FIGURES 3 and 5, the spring 67 has urged the bolt 62 into the housing 48 to the limit of its travel. The head 63 of the bolt has engaged the central wall 55 of the pawl 51 to urge the teeth 56 into engagement with one of the sets of notches, 39 and 39', positioned in the plate 36.

A rotary solenoid 73 of conventional design is employed as a control means for releasing the latch mechanism 25. As shown in FIGURE 1, the rotary solenoid is energized from the vehicle storage battery 74 by means of a push button switch 75 that may be mounted in some convenient position in the vehicle, for example, on the instrument panel, on the steering wheel or on the steering column. As shown in FIGURE 3, an arm 76 is pivotally connected to the rotary armature of the solenoid by means of a nut and bolt assembly shown at 77. The arm has a hooked end 78 that is positioned within the apertures 81 and 82 in the central wall 55 of the pawl 51. When the push button switch 75 is depressed the rotary solenoid 73 will be energized and the armature will rotate in a clockwise direction about a central pin 79, as viewed in FIGURE 3, thereby moving the arm 76 to the left and pivoting the pawl 51 in a clockwise direction about the nut and bolt assembly 52 against the force of the helical spring 67. This action disengages the teeth 56 of the pawl 51 from the notches in the member 36 thereby permitting the steering column 10 and wheel 12 to move into its displaced position 26 under the force of the spring means 27. An added feature of the invention is the latching of the steering column and the steering wheel in the displaced position 26 when the operator disengages the push button switch 75 and the rotary solenoid 73 is de-energized. At that time the spring assembly 61 will move the pawl 51 in a counterclockwise direction thereby engaging the teeth 56 of the pawl within the notches 42 and 42'.

The invention also provides means for permitting the operator of the vehicle to return the steering column and wheel from the displaced position 26 to any one of the operative or driving positions 21 through 24 that has been previously selected by the driver of the vehicle. This means may take the form of an adjustable position selector or stop means shown most clearly in FIGURES 1, 3 and 4, and it includes a lever 91 pivotally mounted on a side wall 92 of the housing 48 by means of a nut and bolt assembly 93. This lever has one arm 94 that extends downwardly from the nut and bolt assembly 93 toward the steering column 10. Arm 94 has a tooth 95 that extends through an elongated aperture 96 in the side wall 92 of the housing. Tooth 95 has an end portion 97 of reduced section that extends into the stepped aperture 43 in the plate 36 for engagement with any one of the shoulders 44 through 47 of this stepped aperture. The lever 91 has a second arm 100 that extends in a direction either to the left or right of the steering column 10, and as shown in FIGURE 1 it extends to the right of the steering column and hence to the right of the vehicle operator. The arm 100 has a handle 101 to permit the operator to move it into a plurality of discrete spaced positions as determined by the detent mechanism shown generally at 102. The detent mechanism includes a plurality of beveled circular apertures 103 through 106 in an outwardly extending plate 107 of the housing 48. A ball 108 is spring urged by a leaf spring 109 into engagement with one of the beveled circular apertures 103 through 106. The leaf spring 109 is secured to the lever 91 by a bolt 110.

The adjustable position selector or stop means described above permits the operator of the vehicle to position the steering wheel in any one of the four driving or operative positions 21 through 24. For example, if the handle 101 and lever arm 100 are rotated so that the ball 108 is engaged within the aperture 104 of the plate 107, as shown in FIGURE 5, the reduced portion 97 of the tooth 95 will be positioned in engagement with the shoulder 45 of the stepped aperture 43. This positions the steering column 10 and wheel 12 in the position 22 as shown in FIGURE 1 and it limits the travel of the steering column downwardly to the position 22 when the vehicle operator moves the steering column toward the operative or driving positions 21 through 24 from the displaced position 26. This position adjustable selector or stop means thus permits the vehicle operator to position the steering column in any one of the operative or driving positions 21 through 24 and permits him to automatically locate the steering column in this position after it has been positioned in the displaced position 26.

*Operation*

Assume that the vehicle operator is seated behind the steering wheel 12 as shown in FIGURE 1 and that the adjustable selector mechanism has been set to position the steering column in the position 22. When the vehicle operator wishes to leave the vehicle, he will depress the push button switch 75 to thereby actuate the rotary solenoid 73. The actuation of the rotary solenoid 73 will pivot the pawl 51 clockwise against the bias of the spring assembly 61 thereby removing the teeth 56 of the pawl 51 from the set of notches 39 and 39'. The steering column 10 and steering wheel 12 will then be moved automatically to the displaced position 26 under the urging of the spring means 27. The operator may then open the push button switch 75 and the steering column and steering wheel will be latched in the displaced position 26. This occurs because spring assembly 61 rotates the pawl 51 counterclockwise and the teeth 56 engage the set of notches 42 and 42' in the plate 36.

When the vehicle operator re-enters the driver's seat he depresses or actuates the push button switch 75 thereby causing the rotary solenoid 73 to disengage teeth 56 of pawl 51 from the set of notches 42 and 42'. The vehicle operator then moves the steering column and the steering wheel toward the driving or operative positions 21 through 24. When the position 22 has been reached the reduced section 97 of tooth 95 on the lever 91 will engage the shoulder 45 of stepped aperture 43 in the plate 36 thereby positioning the steering column and wheel in the position 22. When the operator deenergizes the solenoid 73 by opening push button switch 75, the pawl 51 will again be rotated counterclockwise so that the teeth 56 engage the set of notches 39 and 39' in the plate 36.

It can be appreciated from the above described sequence of operations that the steering mechanism provided in this invention greatly facilitates egress from and access to the driver's seat of the vehicle. An additional advantage of the invention is that the steering column and wheel may be latched into the displaced position 26 to permit the vehicle operator to use the steering wheel and column as an aid in entering and leaving the vehicle.

The driver of the vehicle may also select any one of the plurality of driving or operative positions of the steering column and wheel, 21 through 24, by means of the adjustable selector or stop mechanism. In this instance, if it is assumed that the steering column is positioned in position 22, as shown in FIGURE 1, the driver of the vehicle may select or move the steering column to any one of the other positions, for example, to position 24. To accomplish this the push button switch 75 is depressed thereby energizing the rotary solenoid 73 to move the teeth 56 of pawl 51 from the set of notches 39 and 39'. The operator then moves the steering column and wheel and the lever 91 so that the reduced section 97 of tooth 95 is positioned in engagement with shoulder 47 of stepped aperture 43 and so that the ball 108 is positioned within the aperture 106 in the outwardly extending plate 102 of the housing 49. The vehicle operator then releases the push button switch 75 and the teeth 56 of the pawl 51 are moved into engagement with the set of notches 37 and 37' in the plate 36 under the impetus of the spring assembly 61.

The present invention thus provides an adjustable steering column that may be positioned in any one of a plurality of discrete driving or operative positions. It also provides a mechanism for facilitating access to and egress from the driver's seat of the vehicle by automatically moving the steering column to a displaced position when a latch mechanism holding the steering column in one of the operative positions is released. In addition, the invention provides an adjustable selector or stop mechanism that will locate the steering column in a preselected or driving operative position when the vehicle operator moves the steering column from the displaced position towards the driving or operative positions.

It will be understood that the invention is not to be limited to the exact construction shown and described, but that various changes and modifications may be made without departing from the spirit and scope of the invention as defined in the appended claims.

We claim:

1. In a motor vehicle, a support structure, a steering column, means supporting said steering column on said support structure for movement among a plurality of operative positions and to a displaced position, selector means for locating said steering column in one of said plurality of operative positions upon manual movement of said steering column, latch means for releasably latching said steering column in said one of said plurality of operative positions, means coupled to said support structure and said steering column for moving said steering column from said one of said plurality of operative positions to said displaced position when said latch means is released, said selector means including means for locating said steering column in said one of said operative positions when said steering column is moved from said displaced position toward said operative positions.

2. In an automotive vehicle, a steering column, a steering wheel coupled to said steering column at one end thereof, means pivotally mounting the other end of said steering column to said vehicle for pivotal movement having a substantial vertical component, latch means for releasably latching said steering column in one of a plurality of vertically spaced positions, means coupled to said vehicle and said steering column for automatically moving said steering column to its uppermost position when said latch means is released, and adjustable stop means for limiting the downward movement of said steering column to one of said plurality of vertically spaced positions when the operator of the vehicle applies a downward force on the steering column.

3. In an automotive vehicle, a steering column having a steering wheel coupled to one end thereof, said steering column being pivotally mounted at the other end thereof for movement to one of a plurality of spaced driving positions and to a displaced position that permits easy ingress to and egress from the driver's seat of the vehicle, latch means releasably latching said steering column in one of said plurality of spaced driving positions, means coupled to said steering column and to said vehicle for automatically moving said steering column to said displaced position when said latch means is released, and means for locating said steering column in said one of said driving positions when said steering column is returned from said remote position toward said driving positions.

4. In an automotive vehicle, a steering column, a steering wheel coupled to said steering column at one end thereof, means coupled to said vehicle and the other end of said steering column for pivotally mounting said steering column about a horizontal axis to permit movement of said steering column and said steering wheel in a vertical plane, releasable latch means for releasably latching said steering column in any one of a plurality of vertical positions, said latch means comprising an upstanding plate having a plurality of vertically spaced notches positioned therein, a housing affixed to said vehicle for receiving said upstanding plate, a pawl pivotally affixed to said housing and having tooth means capable of engaging said notches, means engaging said pawl and said housing for positioning said tooth means within one of said vertically spaced notches for latching said steering column in one of said vertically spaced positions, and means operable by the operator of the vehicle for pivoting said pawl to disengage said tooth means from said one of said notches whereby said latch means is released.

5. The combination of claim 4 in which a spring is coupled to said vehicle and to said steering column for urging said steering column into its uppermost vertical position, whereby said steering column and wheel will rise to its uppermost veritcal position when said latch means is released.

6. The combination of claim 5 which is further characterized by an adjustable selector means coupled to said vehicle and to said steering column for limiting the downward movement of said steering column and said steering wheel to said one of said plurality of vertical positions when said steering column is moved from said uppermost vertical position toward the remainder of said plurality of vertical positions.

7. The combination of claim 6 in which said adjustable selector means comprises a lever pivotally mounted to said housing and having a projection positioned in a stepped aperture in said upstanding plate.

8. In an automotive vehicle, a steering column, a steering wheel coupled to said steering column at one end thereof, means coupled to said vehicle and the other end of said steering column for pivotally mounting said steering column about a horizontal axis to permit movement of said steering column and said steering wheel in a vertical plane, latch means coupled to said vehicle and to said steering column for releasably latching said steering column in one of a plurality of vertically spaced positions, and selector means for selecting one of said plurality of vertically spaced positions, said selector means comprising a plate connected to said steering column and having a stepped aperture positioned therein defining a plurality of vertically spaced shoulders, a housing supported by said vehicle, said plate being received within said housing, a selector lever, means for pivotally mounting said selector lever on said housing, said housing having an elongated aperture positioned therein adjacent said last mentioned means, said selector lever having a tooth means extending through said elongated aperture in said housing and into the stepped aperture in said plate for engagement with one of said vertically spaced shoulders in said plate, and detent means coupled to said housing and to said lever for holding said tooth on said lever in position to engage any one of said vertically spaced shoulders in said plate.

9. In an automotive vehicle, a vehicle body, a steering wheel, means rotatably supporting said steering wheel, said means mounted in said vehicle body for moving said first mentioned means and said steering wheel into a plurality of driving positions and a displaced position which facilitates egress from and ingress to the vehicle body, releasable means engaging said first mentioned means for holding said first mentioned means and said steering wheel in a selected one of said plurality of driving positions and for permitting said first mentioned means and said steering wheel to be moved to said displaced position when released, and means coupled to said vehicle body and said first mentioned means for locating said first mentioned means and said steering wheel in said selected position when said first mentioned means and said steering wheel are returned from said displaced position toward said driving positions.

10. In an automotive vehicle, a vehicle body, a steering wheel, means rotatably supporting said steering wheel, said means mounted in said vehicle body for moving said first mentioned means and said steering wheel into a plurality of driving positions and a displaced position which facilitates egress from and ingress to the vehicle body, releasable means coupled to said first mentioned means for holding said first mentioned means and said steering wheel in a selected one of said plurality of driving positions and for permitting said first mentioned means and said steering wheel to be moved to said displaced position when released, means operatively coupled to said first mentioned means for urging said first mentioned means and steering wheel toward said displaced position and means coupled to said vehicle body and said first mentioned means for locating said first mentioned means and said steering wheel in said selected position when said first mentioned means and said steering wheel are returned from said displaced position toward said driving positions.

11. In an automotive vehicle, a vehicle body, a steering wheel, means mounted in said vehicle body for rotatable supporting said steering wheel, means operatively coupled to said first mentioned means for permitting movement of said first mentioned means and said steering wheel into a plurality of driving positions and a displaced position that will permit easy egress from and access to the vehicle body, said means including means for holding said first mentioned means and said steering wheel in a selected one of said driving positions, and means operatively coupled to said first mentioned means for locating said first mentioned means and said steering wheel in said selected position when said first mentioned means and said steering wheel are returned from said displaced position toward said driving positions.

12. In an automotive vehicle, a vehicle body, a steering wheel, means rotatably supporting said steering wheel mounted in said vehicle body, means operatively coupled to said first mentioned means for permitting movement of said first mentioned means and said steering wheel into a plurality of driving positions and a displaced position that will permit easy egress from and access to the vehicle body, releasable holding means operatively coupled to said first mentioned means for holding said first mentioned means and said steering wheel in a selected one of said driving positions, means operatively coupled to said releasable holding means for automatically moving said first mentioned means and said steering wheel into said displaced position when said releasable holding means is released, and means operatively coupled to said first mentioned means for locating said first mentioned means and said steering wheel in said selected position when said first mentioned means and said steering wheel are returned from said displaced position toward said driving positions.

13. In an automotive vehicle, a vehicle body, a steering wheel, a steering shaft coupled to said steering wheel, means rotatably supporting said steering shaft, means coupled to a stationary portion of said vehicle body and said first mentioned means for supporting said steering shaft and said steering wheel for vertical pivotal movement about an axis substantially transverse to the longitudinal axis of the vehicle into a plurality of operative driving positions and a displaced position that facilitates egress from and access to the vehicle body, releasable holding means operatively coupled to said first mentioned means for holding said first mentioned means and said steering shaft and said steering wheel in a selected one of said driving positions, and means operatively coupled to said first mentioned means for locating said first mentioned means, said steering shaft and said steering wheel in said selected one of said driving positions as said first mentioned means, said steering shaft and said steering wheel are moved from said displaced position toward said driving positions.

14. In an automotive vehicle, a vehicle body, a steering wheel, a steering column coupled to said steering wheel, means coupled to a stationary portion of said vehicle body and said steering column for supporting said steering column and said steering wheel for vertical pivotal movement about an axis substantially transverse to the longitudinal axis of the vehicle into a plurality of operative driving positions and a displaced position that facilitates egress from and access to the vehicle body, releasable holding means operatively coupled to said steering column for holding said steering column and said steering wheel in a selected one of said driving positions, spring means coupled to said steering columns for urging said steering column and said steering wheel toward said displaced position, and means operatively coupled to said steering column for locating said steering column and said steering wheel in said selected one of said driving positions as said steering column and said steering wheel are moved from said displaced position toward said driving positions.

15. In an automotive vehicle, a steering wheel, means rotatably supporting said steering wheel, means coupled to said first mentioned means for adjustably supporting said first mentioned means and said steering wheel for pivotal movement in a vertical plane about an axis transverse to the longitudinal axis of the vehicle into a plurality of operative driving positions and for permitting said first mentioned means and said steering wheel to be moved to a displaced position that facilitates access to and egress from the vehicle, means coupled to said first mentioned means for releasably holding said first mentioned means and said steering wheel in any driving position selected by the vehicle operator, and means engaging said first mentioned means for relocating said first mentioned means and the steering wheel in said driving position selected by the vehicle operator after said first mentioned means and said steering wheel have been moved to a displaced position and are returned toward the driving positions.

References Cited by the Examiner

UNITED STATES PATENTS

| 665,651 | 1/1901 | Courteen | 74—493 X |
| 1,367,695 | 2/1921 | Gray | 74—493 |
| 2,903,904 | 9/1959 | Mackie | 74—493 |
| 3,167,971 | 2/1965 | Ziegler et al. | |
| 3,199,625 | 8/1965 | Liebreich. | |

FOREIGN PATENTS

| 875,615 | 5/1953 | Germany. |

FRED C. MATTERN, JR., *Primary Examiner.*

C. F. GREEN, *Assistant Examiner.*